(12) United States Patent
Flood et al.

(10) Patent No.: US 9,242,215 B2
(45) Date of Patent: Jan. 26, 2016

(54) INFILTRATION COMPOSITIONS FOR PCD BY USING COATED CARBIDE SUBSTRATES

(75) Inventors: Gary Flood, Canal Winchester, OH (US); Abhijit Prabhakar Suryavanshi, Columbus, OH (US)

(73) Assignee: Diamond Innovations, Inc., Worthington, OH (US)

( * ) Notice: Subject to any disclaimer, the term of this patent is extended or adjusted under 35 U.S.C. 154(b) by 162 days.

(21) Appl. No.: 13/598,893

(22) Filed: Aug. 30, 2012

(65) Prior Publication Data

US 2014/0059943 A1 Mar. 6, 2014

(51) Int. Cl.
| | | |
|---|---|---|
| *B24D 3/00* | (2006.01) | |
| *B24D 11/00* | (2006.01) | |
| *B24D 18/00* | (2006.01) | |
| *C09K 3/14* | (2006.01) | |
| *B01J 3/06* | (2006.01) | |
| *B24D 3/10* | (2006.01) | |
| *B24D 99/00* | (2010.01) | |

(52) U.S. Cl.
CPC ... *B01J 3/06* (2013.01); *B24D 3/10* (2013.01); *B24D 99/005* (2013.01)

(58) Field of Classification Search
USPC .................................................. 51/295, 293
See application file for complete search history.

(56) References Cited

U.S. PATENT DOCUMENTS

| | | | | |
|---|---|---|---|---|
| 4,380,471 | A * | 4/1983 | Lee et al. | 419/11 |
| 4,743,515 | A * | 5/1988 | Fischer et al. | 428/698 |
| 4,798,026 | A * | 1/1989 | Cerceau | 451/540 |
| 4,837,089 | A * | 6/1989 | Araki et al. | 428/552 |
| 5,469,927 | A | 11/1995 | Griffin | |
| 5,510,193 | A | 4/1996 | Cerutti et al. | |
| 5,603,070 | A | 2/1997 | Cerutti et al. | |
| 2009/0178345 | A1* | 7/2009 | Russell et al. | 51/307 |
| 2012/0047814 | A1* | 3/2012 | Mukhopadhyay et al. | 51/309 |

* cited by examiner

*Primary Examiner* — James McDonough

(57) ABSTRACT

A polycrystalline diamond compact made from a high pressure, high temperature process is provided. The compact includes a metal carbide substrate including a binder and at least one inner layer of polycrystalline diamond disposed on the substrate. The polycrystalline diamond has a diamond phase and a metal phase forming an interconnected mutually exclusive network. The metal phase is a material different than that of the binder of the substrate to provide improved diamond sintering and final polycrystalline diamond compact properties. Prior to processing at least one coating is disposed on the substrate, and the layer of diamond particles is disposed on the at least one coating. During the high pressure, high temperature process the coating melts and fully sweeps into the diamond layer.

22 Claims, 3 Drawing Sheets

INFILTRATION COMPOSITIONS FOR PCD BY USING COATED CARBIDE SUBSTRATES

TECHNICAL FIELD AND INDUSTRIAL APPLICABILITY

The present disclosure relates to a polycrystalline diamond (PCD) compact having improved infiltration compositions, which improve abrasion, impact resistance and thermal stability. These polycrystalline diamond (PCD) compacts are used in a variety of applications such as cutting, milling, grinding, drilling and other abrasive operations.

SUMMARY

In one embodiment, a polycrystalline diamond compact made from a high pressure, high temperature process is provided. The compact includes a metal carbide substrate including a binder and at least one inner layer of polycrystalline diamond disposed on the substrate. The polycrystalline diamond has a diamond phase and a metal phase forming an interconnected mutually exclusive network. The metal phase is a material different than that of the binder of the substrate to provide improved diamond sintering and final polycrystalline diamond compact properties.

In another embodiment, a high pressure, high temperature compact assembly is provided. The assembly includes a metal carbide substrate, at least one coating disposed on the substrate, and a layer of diamond particles disposed on the at least one coating. During the high pressure, high temperature process the coating melts and fully sweeps into the diamond layer.

The coating is melted in the HPHT process and infiltrates into the compacted bed of diamonds, thus providing a sweep chemistry designed to improve diamond sintering and final polycrystalline diamond properties.

In still another embodiment, a method for making a polycrystalline diamond compact comprises the steps of providing a metal carbide substrate, disposing at least one coating on the substrate, disposing an outer layer of diamond material on the at least one coating and subjecting the substrate, at least one coating and layer of diamond material to at least one high pressure and a high temperature condition to melt the coating and allow a first sweep of the at least one coating into said diamond layer such that the coating is fully swept into the diamond layer.

These and other objects, features, aspects, and advantages of the present invention will become more apparent from the following detailed description of the preferred embodiment relative to the accompanied drawings, in which:

DETAILED DESCRIPTION

Figure 3:
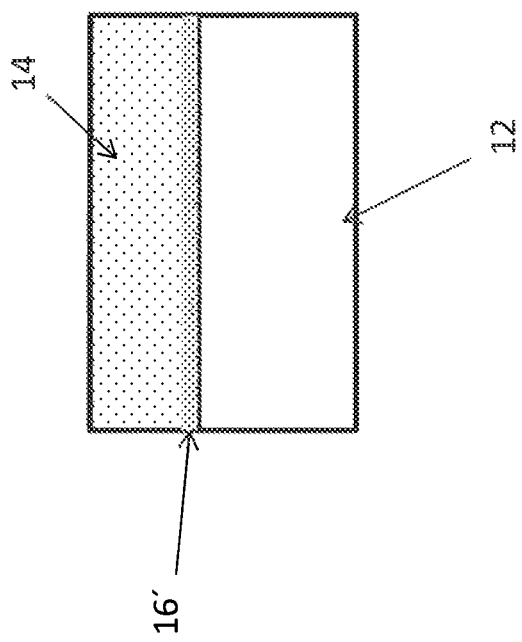
FIG. 3 is a cross-sectional view of a polycrystalline diamond compact according to the present invention.

Abrasive compacts typically include polycrystalline diamond or cubic boron nitride particles bonded into a coherent hard conglomerate. The conglomerate is an interconnected mutually exclusive network of two phases. The majority phase is diamond particles. The minority phase is non-diamond solvent-catalyst, typically metal. As defined herein, an interconnected mutually exclusive network of particles is a network of particles wherein the diamond crystals or particles are sintered together to form a continuous diamond structure. This structure, the majority phase, comprises interparticle diamond-to-diamond bonds without interposed, non-diamond, solvent-catalyst phases. A volume of residual solvent-catalyst metal, the minor phase, may be disposed in interstices between the diamond crystals or particles.

The abrasive particle content of abrasive compacts is high and there is an extensive amount of direct particle-to-particle bonding. Abrasive compacts are made under elevated temperature and pressure conditions at which the abrasive particle, be it diamond or cubic boron nitride, is crystallographically stable.

Fabrication of the composite is typically achieved by placing a cemented carbide substrate into the container of a press. A mixture of diamond grains or diamond grains and solvent-catalyst is placed atop the substrate and compressed under high pressure, high temperature (HPHT) conditions. In so doing, metal binder migrates from the substrate and "sweeps" through the diamond grains to promote a sintering of the diamond grains. As a result, the diamond grains become bonded to each other to form a diamond layer, and that diamond layer is bonded to the substrate along a planar or non-planar interface. Metal binder remains disposed in the diamond layer within pores defined between the diamond grains.

A composite formed in the above-described manner may be subject to a number of shortcomings. For example, the coefficients of thermal expansion and elastic constants of cemented carbide and diamond are close but not exactly the same. Thus, during heating or cooling of the polycrystalline diamond compact (PDC), thermally induced stresses occur at the interface between the diamond layer and the cemented carbide substrate, the magnitude of these stresses being dependent on the disparity in thermal expansion coefficients and elastic constants.

Prior art teaches infiltration by the molten binder of the carbide substrate itself and infiltration from sources other than the substrate, for example, from discs or foils or from powder beds adjacent the diamond substrate bed. Non-infiltration methods include mixture of solvent materials blended directly in the diamond substrate. However, as described further herein, infiltration of liquid metal alloys other than the binder in the cobalt bonded tungsten carbide (Co—WC) substrate from the diamond carbide interface will impart improved diamond sintering and an improvement in ultimate PCD properties that come from improved sweep compositions.

Figure 1:
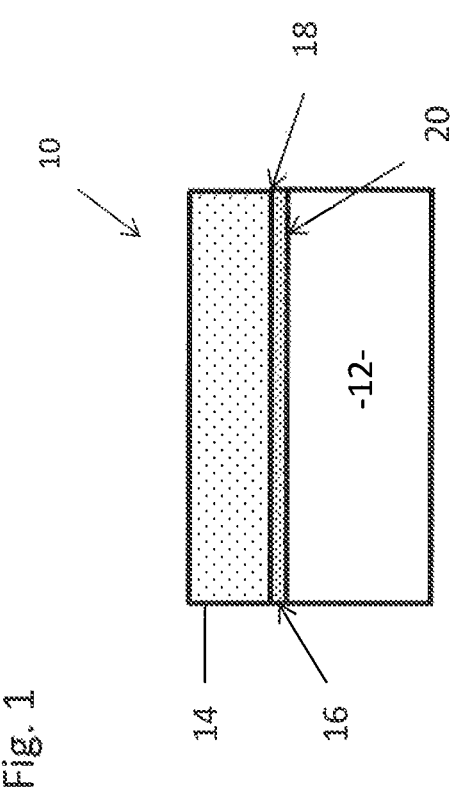
FIG. 1 is a cross-sectional view of a high pressure, high temperature compact assembly according to one embodiment of the present invention.

Referring to FIG. 1, a polycrystalline diamond assembly 10 to be formed into a composite under high pressure, high temperature (HPHT) conditions includes a substrate 12, preferably comprised of a cemented metal carbide, and a bed or abrasive outer layer 14 of diamond particles or grains on substrate 12. Substrate 12 is preferably a cobalt bonded tungsten carbide (Co—WC) substrate. However, it should be appreciated that other metal carbide materials can be used for the substrate.

At least one inner layer 16 is disposed between diamond layer 14 and substrate 12. Although only one layer 16 is shown, it should be appreciated that a plurality of superimposed inner layers, each having a different melting point, can be provided.

Layer 16 can be a metallic alloy which has been coated on the carbide substrate by any of several means such as sputtering, electrolytic, pyrolytic, electroless, chemical vapor deposition, physical vapor deposition, high velocity oxygen fuel spraying or others. Examples of coatings, selected from the group, but not limited to such, include cobalt, silicon, boron, zirconium, aluminum, ruthenium, chromium, manganese, molybdenum, platinum, palladium, or layered coatings of such materials, including their alloys.

Layer 16 can be a thin coating, for example, about 60 μm to about 80 μm thick. As described above, coating 16 is melted in the HPHT process and completely infiltrates into the compacted bed of diamond, thus providing a sweep chemistry designed to improve diamond sintering and final PCD properties. As will be described further herein coating 16 has a melting point lower than the melting point of the binder material of substrate 12.

Figure 2:
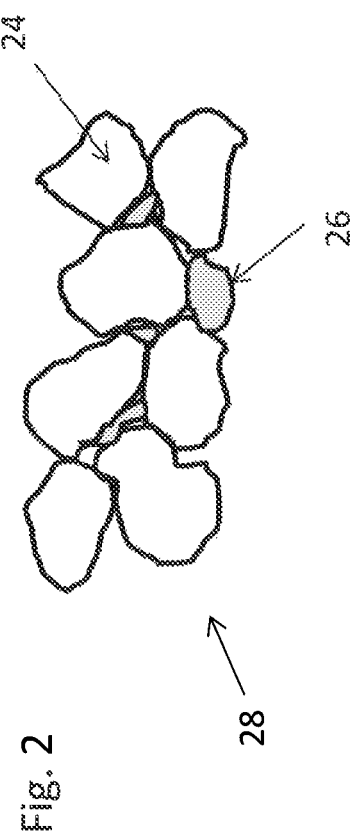
FIG. 2 is an enlarged view of particles of a diamond phase and metal phase of a polycrystalline diamond layer.

As shown in FIG. 2, in an initial HPHT stage, coating 16 melts and a metal phase 26 thereof completely infiltrates into a diamond phase 24 of diamond bed 14 to form an interconnected mutually exclusive network of particles 28.

The first sweep metal of coating 16 can have a lower melting point (MP), for example, of approximately 100° C., than the binder of substrate 12. Accordingly, coating 16 will be swept into layer 14 of the diamond particles as discussed above and as shown in FIG. 3 coating 16 will be completely absorbed therein.

Various sweep materials of coating 16 having different melting points can be used. For example, Co-12Zr (MP 1460-1473° C.); Co-1Si (MP 1490° C.); Co-2C (MP 1350° C.); Co-37Mo (MP 1340° C.); Co-3B (MP 1330° C.); Co-2C-10Zr (MP~1340° C.); Co-3B-10Zr (MP~1330° C.); Co-3B-35Mo (MP~1320° C.); Co-10W (MP 1500° C.). It should be appreciated that other materials are contemplated by the present invention and not limited to the previous examples. Preferably, coating 16 has a Zr content to help remove oxides, moisture, hydroxides from the diamond bed during this initial flush.

As discussed supra, multiple superimposed coatings 16 can be provided. The use of different coatings with sweep materials having different melting points permits a multi-stage infiltration process by selecting layers of compositions of increasing melting points. It also permits the use of an infiltration composition with a melting point higher than that of the substrate, which may impart a higher thermal stability to the PCD layer. In addition, it provides an effective way to impart uniform sweep from a non-planar diamond-carbide interface.

Thus, the present invention provides at least a two stage sweep of material into the diamond particle bed. The first sweep of the metal from at least one coating 16 at the lower melting point is followed by the second sweep of metal from the binder of the substrate. The second sweep metal from the binder of substrate 12 will push the low quantity of first metal through the particle bed. The first sweep metal will play a role in the final composition, because depending on the amount of the first sweep metal, the final composition may partially or fully contain the first sweep metal. In the case wherein coating 16 is fully swept into the diamond particle bed, the final composition is a blend of both coating 16 and the binder. The blend will be a gradient in the combined composition from interface 18 to an outer surface of the diamond layer. In another instance, a portion of coating 16 may remain juxtaposed at interface 18 with the substantial portion thereof having been swept into the diamond bed.

It should be appreciated that the second metal will determine the thermal properties of the assembly. For example, the second sweep material of substrate 12 can be Co-1Si (or Co-2Si, e.g.), 70Co30Ru, MP 1650° C. or 67Co33Al, MP about 1645° C. (CoAl). Accordingly, it is possible to raise the temperature threshold for thermal stability of the compact, including graphitization. Other materials can be used as discussed herein.

Layer 14 can also be a Co—B—Zr layer having a thickness of, for example, approximately 10 to approximately 20 μm thick. Layer 16 can be Co—Si with a thickness of, for example, approximately 60 to approximately 80 μm thick. It should be appreciated that the present invention is not limited to these thicknesses. It is also possible to replace the cobalt with other non-carbide formers. For example, 95Y5Mn with a melting point of about 1500° C.

Figure 4:
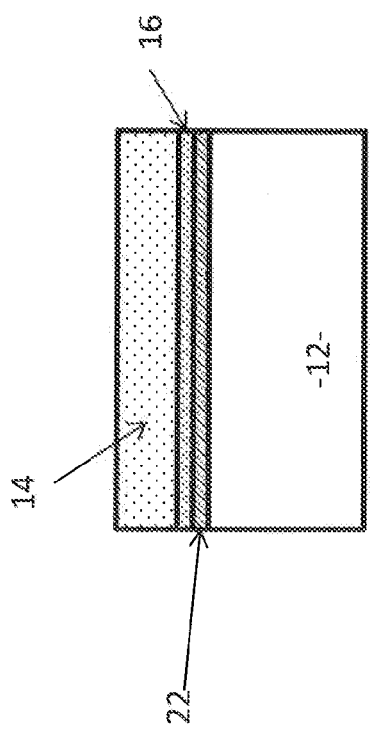
FIG. 4 is a cross-sectional view of a high pressure, high temperature compact assembly according to another embodiment of the present invention.

Referring to FIG. 4, in order to prevent sweep of the binder, there can be provided a blocking layer 22 over entire substrate 12, or at least on three sides thereof, prior to applying the layers 14 and 16. Substrate blocking layer 22 can be a thin coating, for example 10 μm thick, of TiC or TiN. Other binder sweep preventing materials can be used. It should also be appreciated that the sweep materials are different from the material of substrate blocker 22.

In another aspect of the invention, the surface of a carbide interface 20 (FIG. 1) between coating 16 and substrate 12 is modified by diffusion of a chemical species, for example, Si or B, into the regions adjacent to the interface. The sweep thereby becomes a mixture of the carbide substrate binder and the diffused species. For example, the sweep material can be 95Co-5Si whereby Si is swept into interstices.

Figure 5:
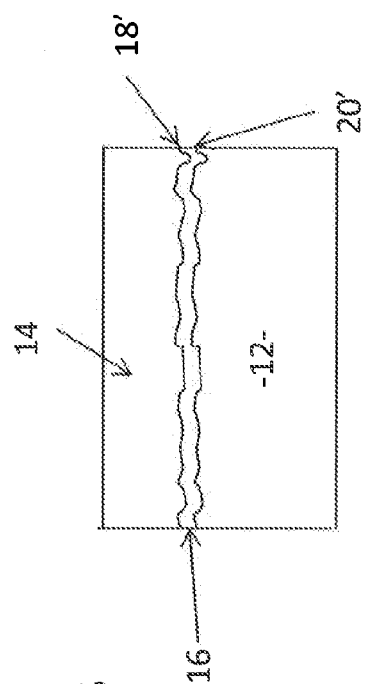
FIG. 5 is a cross-sectional view of a high pressure, high temperature compact assembly according to third embodiment of the present invention.

Referring to FIG. 5, interfaces 18', 20' between the respective layers and substrate can be non-planar to improve interface bonding. As shown, the interfaces can have a plurality of wavy regions therein. However, it should be appreciated that other interface treatments can be provided to improve bonding.

For example, the second sweep is a standard cobalt binder infiltration sweep from substrate 12 to coating 16. Layer 14 is swept with Si—B (boronized silicon) prior to the second sweep, but only with enough Si—B to sweep to interface 18 (FIG. 1), i.e., the Co sweep front meets the Si—B sweep front at interface 18.

In yet another approach, the coating can be made of other weak carbide formers rather than alloys or compositions which contain cobalt. For example, 95Y5Mn (MP about 1500° C.). Such a coating would provide a sweep chemistry substantially different from the substrate binder, yet provide sufficient carbon solubility within the diamond layer to promote sintering. A range of compositions within the Mn—Y alloy system would provide similar behavior at different melting points. The advantage of this approach is that it results in a sintered diamond layer with a non-cobalt metal phase, which offers different thermal properties of the diamond layer.

Figure 6:
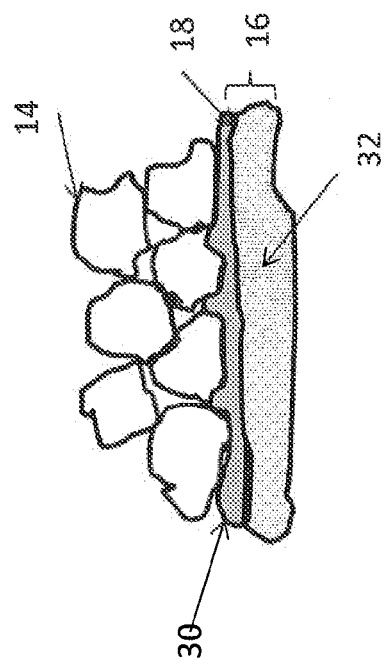
FIG. 6 is an enlarged view of a layer of diamond particles and sweep front according to yet another embodiment of the present invention.

Referring to FIG. 6, a sweep front 30 of coating 16 entering the particles of diamond bed layer 14 at interface 18 can have a chemistry that is different than the chemistry of sweep bulk 32 of coating 16. As sweep front 30 enters the particles of bed 14 it will disperse and work itself therebetween. Because the chemistry of sweep 30 is different it will effect and enhance sintering of the diamond crystals in a way superior to just the bulk 32 to improve bonding at interface 18.

Sweep front 30 can be of any composition of liquid metallic elements into which carbon can be dissolved and re-precipitated at HPHT conditions, for example, Co, Fe, Ni, or Mn. Further enhancement to sintering can be attained by adding lesser amounts of materials which provide higher levels of carbon solubility in liquid cobalt, for example Ta, Mo, W, Cr, Nb, Mn, or V.

EXAMPLE

A tungsten carbide substrate with 13.5% by weight cobalt-based binder is coated with a layer of gold according to the present invention. Gold has a lower melting point than the binder material and will melt and sweep before the binder material at HPHT conditions. One sample was coated with a 2 nm gold coating and another sample was coated with a 6 nm gold coating. Both samples were then put into a refractory metal container along with diamond powder and used for making polycrystalline diamond compacts (PDC) by the HPHT process as described earlier. In a typical PDC with an uncoated substrate, several defects can be seen at the interface between the diamond and substrate. These defects include areas rich in cobalt and re-grown tungsten carbide grains and may influence the fracture toughness of the PDC. In the case of the gold-coated substrates, it was observed that defects at the interface between polycrystalline diamond and the substrate were noticeably reduced. The thicker gold coating suppressed the defects better than the thinner coating. It should be appreciated that some coating compositions may be inferior due to a weakening of the bond between the diamond layer and the substrate.

Referring to FIGS. 7(a)-(e), in a method for making a polycrystalline diamond compact according to the present invention metal carbide substrate 12 is provided. At least one layer of coating 16 is applied to substrate 12 as shown in FIG. 7(b) by sputtering, electrolytic, pyrolytic, electroless, chemical vapor deposition, physical vapor deposition, high velocity oxygen fuel spraying or others. Examples of coatings, selected from the group, but not limited to such, include cobalt, silicon, boron, zirconium, aluminum, ruthenium, chromium, manganese, molybdenum, platinum, palladium, or layered coatings of such materials.

Figure 7:
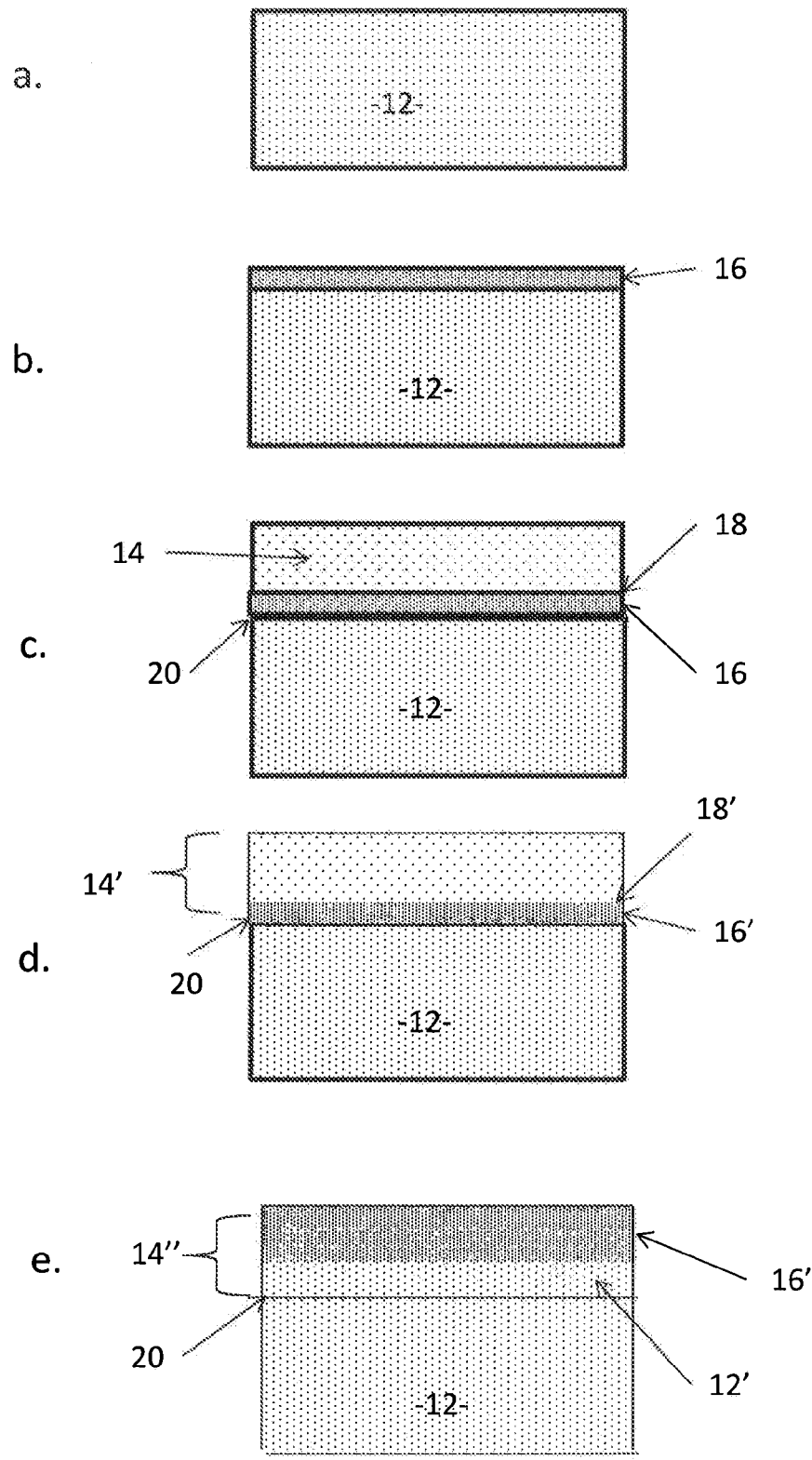
FIG. 7(a)-(e) are cross-sectional views of a method of making a polycrystalline diamond compact according to the present invention.

In FIG. 7 (c), layer or bed 14 of diamond material is positioned on coating 16. Diamond layer 14 includes of diamond particles and interstices therebetween, as described supra.

Referring to FIG. 7(d) and described above, substrate 12, thin coating 16 and diamond layer 14 are sintered in a first high pressure, high temperature condition to melt the coating and allow a first sweep of the at least one coating into the diamond layer. As shown, coating 16' is fully swept into the diamond layer. Because the melting point of coating 16 is lower than the melting point of the substrate binder, the binder metal does not melt or sweep at this point in the process.

Diamond layer 14' is comprised of diamond particles and interstices therebetween, and during the sweep of the coating, the melted coating flows into the interstices to form an interconnected mutually exclusive network. Accordingly, the coating melts and sweeps into the diamond layer followed by a sweep of the binder metal from the substrate. In one case as set forth above, the coating is fully swept, but the final composition of the metal phase in the diamond is a blend of both the coating material and the binder. The blend will be a gradient in the combined composition from the interface to the outer surface of the diamond layer. Alternatively, a thickness or portion of the coating can remain juxtaposed at the interface between the diamond layer and the substrate, wherein the substantial portion of the coating has been swept.

Referring to FIG. 7(e), substrate 12 and layer 14" of the diamond material containing the melted coating is then subjected to a second high pressure and high temperature condition wherein a higher temperature is used to melt and sweep the binder 12' of the substrate into the diamond layer 14". As shown, binder 12' will push coating 16" further into diamond layer 14".

As described fully above, alternatively, substrate 12 can be coated with a blocking layer prior to applying the coating to prevent the binder from sweeping into the diamond layer. Also coating 16 can be diffused with a chemical species selected from the group consisting of silicon and boron to improve properties and bonding.

Furthermore, a plurality of layers of coating 16 can be superimposed on substrate 12 to alter the sweep chemistry. Likewise as described above, a particular sweep front chemistry can be provided to affect the properties of coating 16.

Although the present invention has been described in relation to particular embodiments thereof, many other variations and modifications and other uses will become apparent to those skilled in the art. It is preferred therefore, that the present invention be limited not by the specific disclosure herein, but only by the appended claims.

What is claimed is:

1. A polycrystalline diamond compact made from a high pressure, high temperature process, the compact comprising:
   a metal carbide substrate including a binder;
   at least one inner layer of polycrystalline diamond disposed on said substrate at an interface, said polycrystalline diamond layer having a diamond phase and a metal phase forming an interconnected mutually exclusive network,
   wherein said metal phase is a material different than the binder of said substrate to provide improved diamond sintering and final polycrystalline diamond compact properties,
   wherein the metal phase is distributed in the polycrystalline diamond layer in a composition gradient, the composition gradient extending from the interface toward an outer surface of the polycrystalline diamond layer, and
   wherein the metal phase comprises zirconium.

2. The polycrystalline diamond compact of claim 1, wherein the metal phase is distributed in the polycrystalline diamond layer in a composition gradient, the composition gradient extending from the interface toward an outer surface of the polycrystalline diamond layer.

3. The polycrystalline diamond compact of claim 1, wherein the metal phase of said polycrystalline diamond layer is an alloy.

4. The polycrystalline diamond compact of claim 1, wherein the metal phase of said polycrystalline diamond layer is a mixture of cobalt and at least one other element.

5. The polycrystalline diamond compact of claim 4, wherein the element is selected from the group of silicon, boron, zirconium, aluminum, ruthenium, chromium, manganese, molybdenum, platinum, palladium and mixtures of such.

6. The polycrystalline diamond compact of claim 1, wherein the metal phase is provided by at least one coating disposed on said substrate prior to the high temperature, high pressure process that has melted and swept into the diamond phase.

7. The polycrystalline diamond compact of claim 6, wherein the metal phase has a melting point lower than a melting point of the binder of said substrate.

8. The polycrystalline diamond compact of claim 1, wherein the metal phase determines the composition of the polycrystalline diamond layer.

9. The polycrystalline diamond compact of claim 1, wherein said substrate is cobalt bonded cemented tungsten carbide.

10. The polycrystalline diamond compact of claim 1, further comprising a blocking layer disposed on said substrate for preventing sweeping of the binder from said substrate into the polycrystalline diamond layer.

11. The polycrystalline diamond compact of claim 10, wherein said blocking layer is a coating of material selected from the group of titanium, carbides or nitrides thereof, or a combination thereof.

12. The polycrystalline diamond compact of claim 1, wherein the metal phase includes a plurality of alloys, each of the plurality of alloys having a melting point lower than the binder of the substrate.

13. A polycrystalline diamond compact made from a high pressure, high temperature process, the compact comprising:
   a metal carbide substrate including a binder;
   at least one inner layer of polycrystalline diamond disposed on said substrate at an interface, said polycrystalline diamond layer having a diamond phase and a metal phase forming an interconnected mutually exclusive network,
   wherein said metal phase is a material different than the binder of said substrate to provide improved diamond sintering and final polycrystalline diamond compact properties,
   wherein the metal phase is distributed in the polycrystalline diamond layer in a composition gradient, the composition gradient extending from the interface toward an outer surface of the polycrystalline diamond layer, and
   wherein the metal phase includes a plurality of alloys, each of the plurality of alloys having a melting point lower than the binder of the substrate.

14. The polycrystalline diamond compact of claim 13, wherein the metal phase is distributed in the polycrystalline diamond layer in a composition gradient, the composition gradient extending from the interface toward an outer surface of the polycrystalline diamond layer.

15. The polycrystalline diamond compact of claim 13, wherein the metal phase of said polycrystalline diamond layer is an alloy.

16. The polycrystalline diamond compact of claim 13, wherein the metal phase of said polycrystalline diamond layer is a mixture of cobalt and at least one other element.

17. The polycrystalline diamond compact of claim 16, wherein the element is selected from the group of silicon, boron, zirconium, aluminum, ruthenium, chromium, manganese, molybdenum, platinum, palladium and mixtures of such.

18. The polycrystalline diamond compact of claim 13, wherein the metal phase is provided by at least one coating disposed on said substrate prior to the high temperature, high pressure process that has melted and swept into the diamond phase.

19. The polycrystalline diamond compact of claim 13, wherein the metal phase determines the composition of the polycrystalline diamond layer.

20. The polycrystalline diamond compact of claim 13, wherein said substrate is cobalt bonded cemented tungsten carbide.

21. The polycrystalline diamond compact of claim 13, further comprising a blocking layer disposed on said substrate for preventing sweeping of the binder from said substrate into the polycrystalline diamond layer.

22. The polycrystalline diamond compact of claim 21, wherein said blocking layer is a coating of material selected from the group of titanium, carbides or nitrides thereof, or a combination thereof.

* * * * *